W. GALE.

Straw Cutter.

No. 938. Reissued April 3, 1860.

Witnesses:

Royal Ball

Ha B Harvey

Inventor:

Warren Gale

N. PETERS, Photo-Lithographer, Washington, D. C.

UNITED STATES PATENT OFFICE.

WARREN GALE, OF CHICOPEE FALLS, MASSACHUSETTS.

IMPROVEMENT IN STRAW-CUTTERS.

Specification forming part of Letters Patent No. 11,667, dated September 12, 1854; Reissue No. 938, dated April 3, 1860.

*To all whom it may concern:*

Be it known that I, WARREN GALE, of Troy, in the county of Rensselaer and State of New York, have invented certain new and useful Improvements in Straw, Hay, and Stalk Cutters, and for other like purposes; and I do hereby declare the following to be a full, clear, and exact description of the same, reference being had to the accompanying drawings, making a part thereof, in which—

Figure 1:
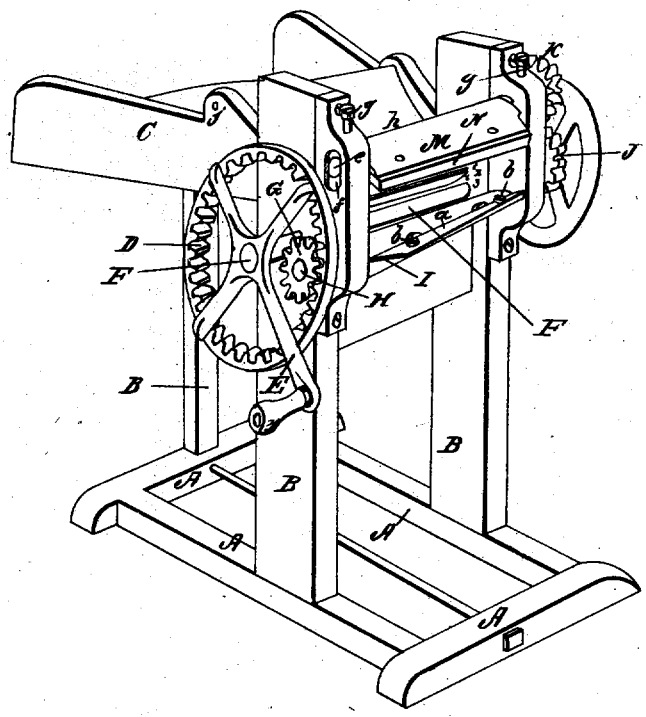
Figure 2:
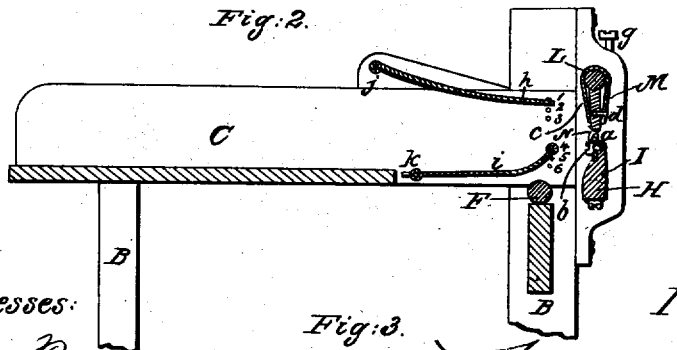

Figure 1 represents a perspective view, and Fig. 2 a vertical longitudinal section through the same.

The nature of my invention relates mainly to arming the cylinder against which the knife cuts with one or more projections, which may be termed "flanges" or "radial arms," against which the knife or knives are to cut.

My invention further relates to the method of arranging the mouth or throat through which the material to be cut is to pass so as to co-operate with the cylinders and aid in governing the length of the cut.

To enable others skilled in the art to make and use my invention, I will proceed to describe the same with reference to the drawings.

A represents the base of the straw-cutter, and B the uprights for supporting the straw-box C and the operating parts of the machine. D is a master cog-wheel, with a crank, E, and arranged on a shaft, F, passing through the machine and suitably supported therein.

The cogs on the wheel D are arranged on its inner perimeter, and a spur or pinion, G, on journal H, meshes with said wheel D, so as to receive its motion therefrom.

The journal H is the axis of what may be termed the "cutting-cylinder." It has a flange, I, upon one side of it, to which the knife *a*, Fig. 2, is attached by set-screws *b*, passing through suitable slots, so as to make said knife adjustable, if desired.

On the opposite end of the journal H from the spur G is another spur-gear, J, which meshes with a similar spur, K, on the journal L, which forms the axis of the upper cylinder, against a flange or projection, M, on which the knife of the lower cylinder cuts, said flange being provided with a piece of leather, raw-hide, or other suitable soft substance, N, to protect the edge of the knife.

Figure 3:
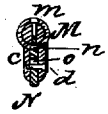

In Fig. 3 may be more particularly seen the method of securing and adjusting the leather or material against which the knife cuts.

The flange M is a part of the cylinder, being on one side thereof, and the leather is placed against the inner side of it, and a plate, *c*, against the leather, the whole being firmly held together by the screws *d*. There is a plate, *n*, over the top edge of the leather, against which set-screws *m*, passing through the axis of the cylinder, press, and by means of which set-screws and plate, by loosening the screws *d*, the leather may be forced down and adjusted to the knife as said leather becomes worn or cut away.

The journals L of the upper cylinder rest in oblong slots *f*, so that by means of set-screws *g* they may also be adjustable, if found expedient, to the knife.

That part of my invention which relates to the throat or mouth through which the material to be cut is to pass is constructed as follows: *h* is an upper and *j* a lower mouth or throat-piece so formed as to incline toward each other where they approach the cylinders. The one, *h*, is hinged at *j*, and near its other end are made in the side of the straw-box the holes 1 2 3, by means of a pin, in which that end may be raised or lowered. The other one, *i*, is hinged in a slot, *k*, so as to be moved toward or from the cylinder, and its other end toward or from the plate *h*, by means of the holes 4 5 6 and a suitable pin fitting into them. The quantity of straw fed up to the knives is regulated by these pieces *h* and *j*. By opening them the straw is cut of greater length and by closing them it diminishes in length, so that different lengths may be cut at pleasure in the same machine.

The upper throat-piece, *h*, being slightly curved, is so hinged in relation to the flange M that the front edge of said throat-piece nearly meets the piece of leather N at each revolution of the latter, whether the front of said throat-piece rests at hole 1, 2, or 3; and the lower throat-piece, *j*, from its double adjustability, can be made to nearly meet the knife at each revolution of the latter, whether the front of piece *j* rests at hole 4, 5, or 6.

Now, if the throat be expanded, the knife catches the straw at each revolution of the knife sooner than when the throat is contracted, and consequently the straw is drawn forward by the knife at each revolution of the latter in proportion to the variation of the point at which the throat presents the straw to the grasp of the knife and opposing flange. By this arrangement the throat cooperates with the flanged cylinders to govern the length of cut.

As the axes H L are revolved the knife on one comes against the straw on the one side close to the throat, while the flange on the other side strikes the straw immediately opposite the knife. The two now act as a pair of nippers, gradually closing and cutting, and at the same time, by their rotation, gradually drawing the straw forward so as to be cut, or, rather, caught and cut by the next rotation, the facility with which it is allowed to pass through the adjustable throat causing it to pass to a greater or less distance.

When the knife and flange meet in a perpendicular plane, as in Fig. 2, the straw is cut, while immediately behind that plane remains the straw drawn forward by the last operation.

It will be seen that while throat-piece *h* is prevented opening or expanding beyond a certain point, it is left loose and allowed to rest against and press the material to be cut, and this it does whether the mouth or throat be full or only partially filled with the material to be cut—this being for the purpose of giving the material to be and being cut greater steadiness and prevent the cylinders from drawing it forward after the cut is made, as the uncut material is apt, when damp, to cling a little to the projection or flange after the cut is made, and consequently be drawn farther forward and make a longer cut.

Straw-cutters having several knives cutting against a full cylinder are well known, and while my machine is in some respects like such well-known straw-cutters, it is in many other respects quite different.

The use of an open cylinder or a cylinder formed with one or more projections for the knife or knives to cut against, as herein described, allows a greater thickness or body of material to pass through and be cut in the machine, and without clogging, than can possibly be done with a machine using a full cylinder to cut against; consequently my invention makes a superior machine for cutting hay, straw, and such like comparatively fine material, and a far superior machine for cutting large cornstalks or cane-stalks or other comparatively coarse material.

The knives on one cylinder in my cutter are made to cut against the face of the flange on the opposite cylinder. I wish it understood I make the face of the flange of sufficient thickness for the knife to strike square onto it, as I do not intend to cut shear-fashion along the edge of the flange or to cut into the space between flanges.

I mean in this specification by the term "flanges," "radial arm," or "projection" the kind of flange described, and do not mean to include knives having cutting-edges.

The practical operation of my cutters is entirely different from that class of cutters having knives on both cylinders.

Although I can on my cutter cut just as fine with one knife as I can with two, three, four, or a greater number, I would recommend using three or four knives on the cylinder when it is desired to cut the feed less than one inch long, for the reason that in order to cut the feed shorter in my cutter it is necessary to cut through a thinner body of feed than when cutting the feed longer; therefore more knives can be used and greater speed obtained and still work easy.

It is obvious my improvement is applicable to spiral or oblique knives as well as to the straight ones.

My invention may be used in cutting other matter than that mentioned.

Having thus fully described the nature of my invention, I will state I am aware that throats to straw-cutters have been made adjustable so as to approach the knife or recede from it, and also so as to contract or expand in order to compress the straw more or less, therefore I do not claim these features as heretofore used.

I claim—

1. The arranging the flange or flanges on one cylinder so that they will meet the knife or knives on the other cylinder as the two cylinders rotate, substantially in the manner described, and this whether the flange is or is not made of or armed on its face with soft material.

2. In combination with the flanged cylinders, the throat placed in such relative position to said cylinders as to nearly meet the latter at a desired point in their revolution, thus assisting to give a long cut if said throat be expanded and a shorter cut when the throat is contracted, substantially as described.

WARREN GALE.

Witnesses:

ALANSON ABBÉ,
GEORGE J. ALDEN.